(12) United States Patent
Chin et al.

(10) Patent No.: US 7,732,755 B2
(45) Date of Patent: *Jun. 8, 2010

(54) ABSOLUTE ENCODER UTILIZING LIGHT OF DIFFERENT WAVELENGTHS TO REDUCE CROSS TALK

(75) Inventors: Yee Loong Chin, Lahat (MY); Kean Foong Ng, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 11 days.

This patent is subject to a terminal disclaimer.

(21) Appl. No.: 12/269,221

(22) Filed: Nov. 12, 2008

(65) Prior Publication Data

US 2009/0057542 A1  Mar. 5, 2009

Related U.S. Application Data

(62) Division of application No. 11/356,563, filed on Feb. 16, 2006, now Pat. No. 7,465,917.

(51) Int. Cl.
  *G01D 5/34* (2006.01)
  *G01J 3/50* (2006.01)
(52) U.S. Cl. ............ 250/231.13; 250/226; 250/231.15
(58) Field of Classification Search ................
  250/231.13–231.18, 221, 559.4, 237 G, 559.3,
  250/226; 356/614, 617; 438/24–27, 29,
  438/31–33
See application file for complete search history.

(56) References Cited

U.S. PATENT DOCUMENTS

| 4,912,322 | A | * | 3/1990 | Ichikawa | 250/237 G |
|---|---|---|---|---|---|
| 4,953,933 | A | * | 9/1990 | Asmar | 385/124 |
| 5,283,434 | A | | 2/1994 | Ishizuka et al. | |
| 6,194,709 | B1 | | 2/2001 | Briggs et al. | |
| 6,671,058 | B1 | | 12/2003 | Braunecker et al. | |
| 6,946,650 | B2 | | 9/2005 | Yoerger et al. | |
| 7,022,975 | B2 | | 4/2006 | Horton | |
| 7,053,362 | B2 | * | 5/2006 | Tobiason et al. | 250/231.16 |
| 2005/0230608 | A1 | | 10/2005 | Okada | |
| 2005/0236560 | A1 | | 10/2005 | Ch'ng et al. | |

* cited by examiner

*Primary Examiner*—Que T Le
*Assistant Examiner*—Pascal M Bui-Pho

(57) ABSTRACT

An encoder having a code scale, an illumination system, and a plurality of photodetectors is disclosed. The code scale has a plurality of tracks that are illuminated by the illumination system. Each photodetector receives light from a corresponding one of the tracks and generates a signal indicative of a quantity of light received from that track. Each photodetector is limited to detecting light in a band of wavelengths corresponding to that track. Each track generates light in a band of wavelengths corresponding to that track, and the band of wavelengths corresponding to one of the tracks is different from the band of wavelengths corresponding to the tracks that are next to that track. The tracks can include alternating reflective and absorptive stripes, alternating transmissive and reflective stripes, or alternating luminescent and absorptive stripes.

8 Claims, 5 Drawing Sheets

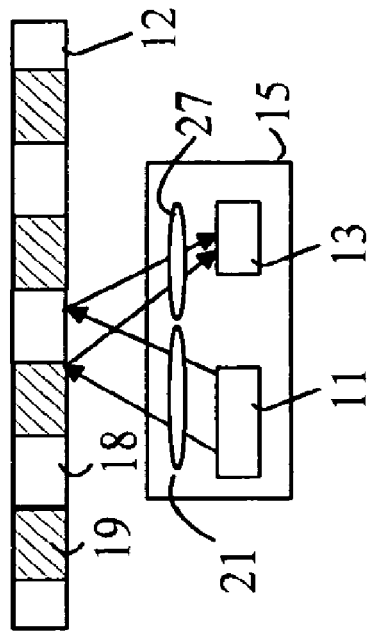
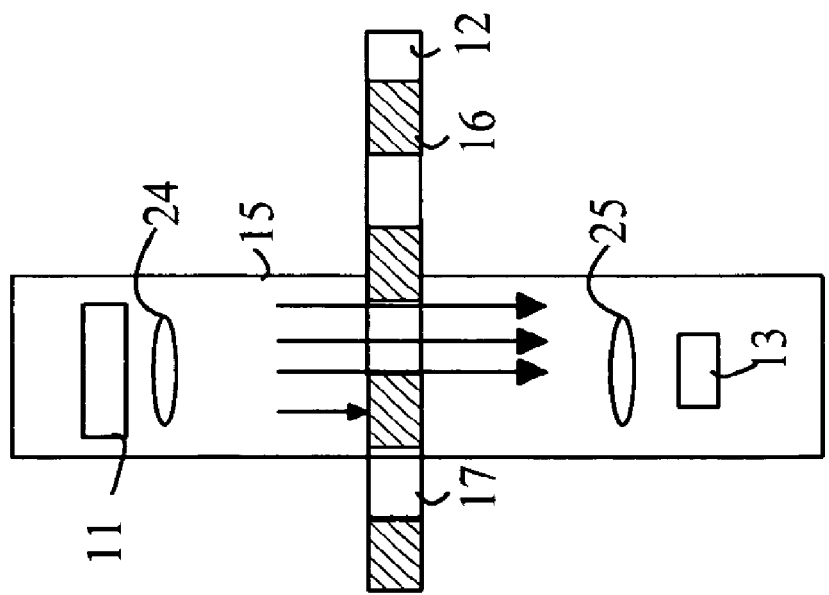
FIGURE 2 (PRIOR ART)
FIGURE 1 (PRIOR ART)

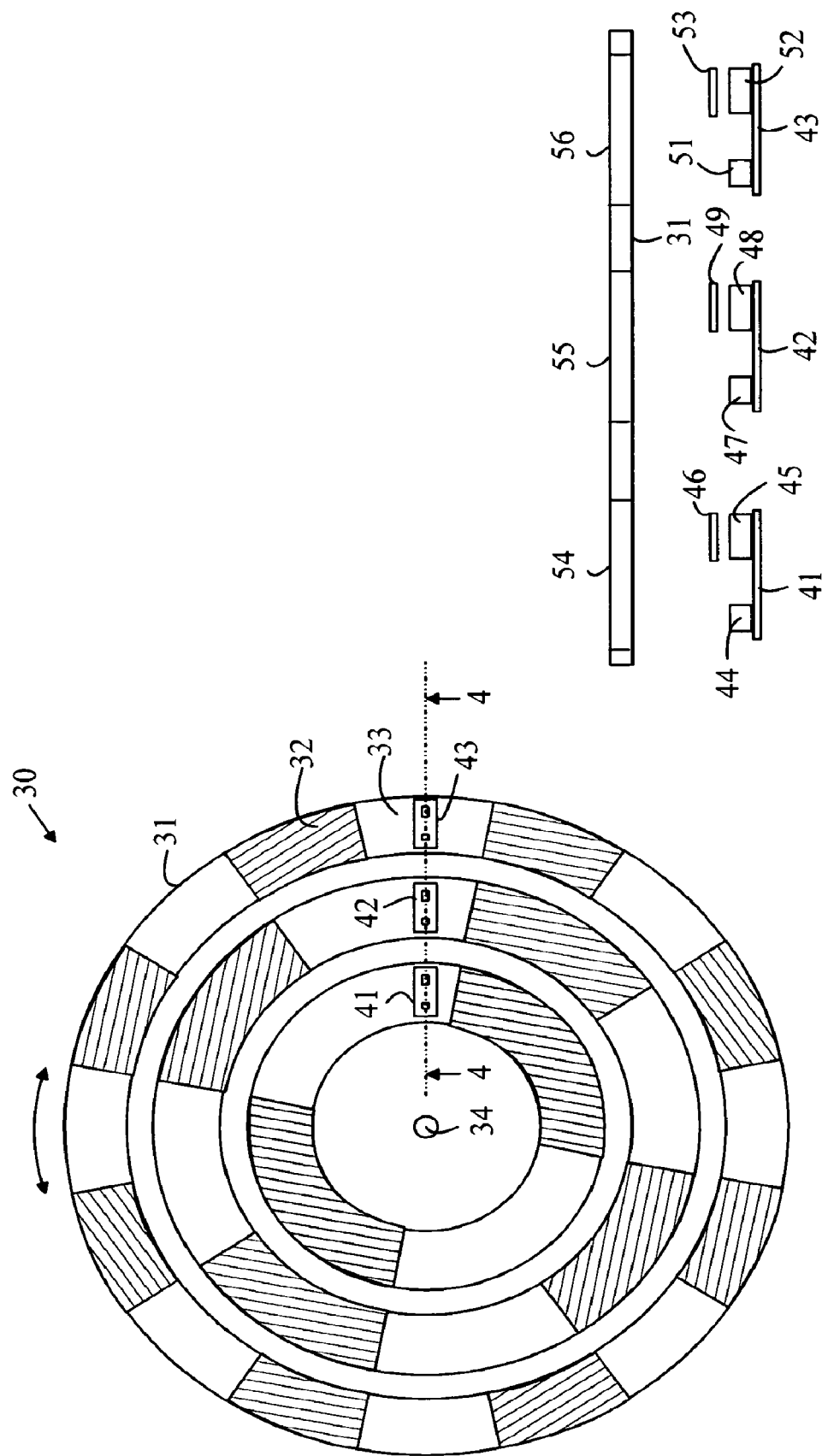

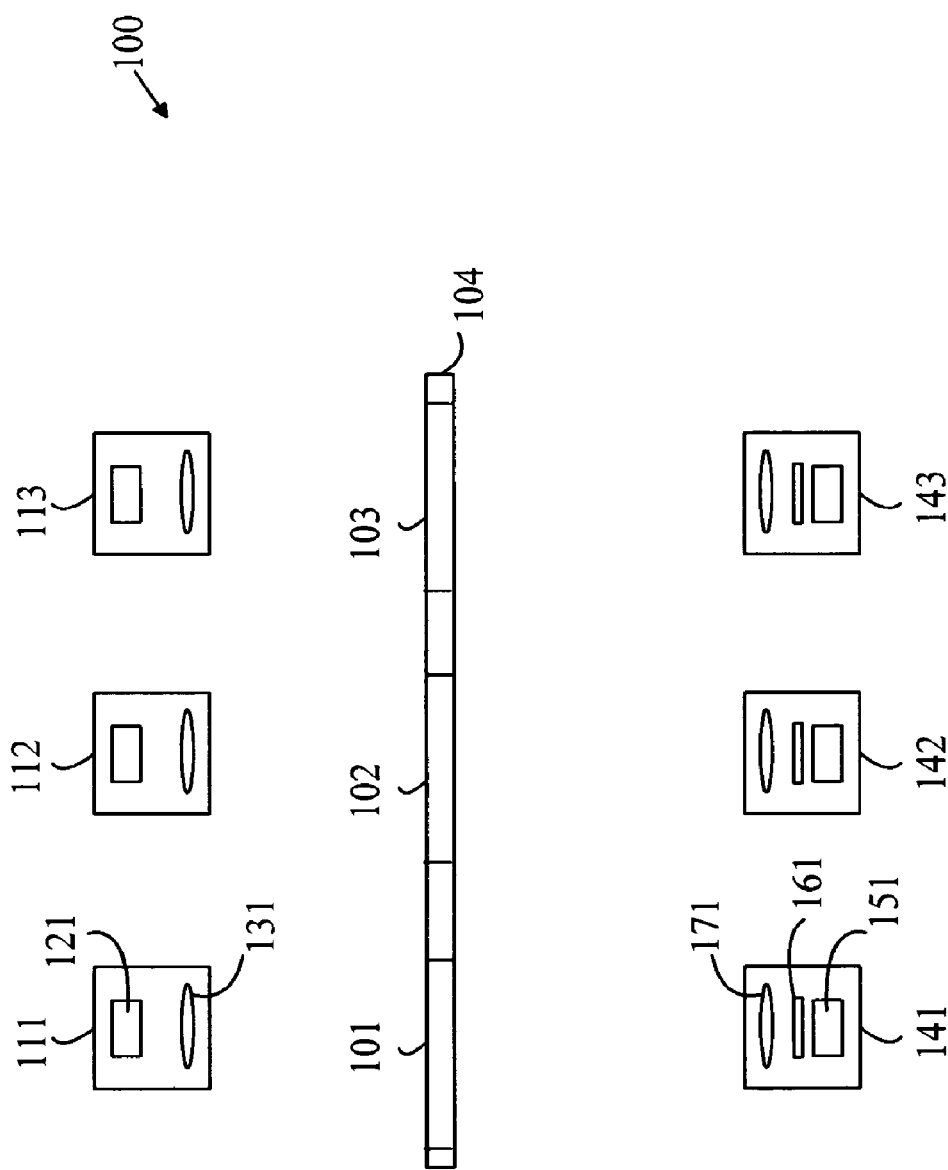

ABSOLUTE ENCODER UTILIZING LIGHT OF DIFFERENT WAVELENGTHS TO REDUCE CROSS TALK

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

To measure the position of a first component that moves with reference to a second component, an encoder typically uses one or more tracks in which each track consists of a series of alternating dark and light stripes that are viewed by a detector that outputs a digital value depending on whether the stripe currently being viewed is light or dark. The track is affixed to one of the components and the detector is affixed to the other.

Encoders can be divided into two broad classes. An incremental encoder typically utilizes a single track that is viewed by a detector that determines the direction and the number of stripes that pass by the detector. The position is determined by incrementing and decrementing a counter as each stripe passes the detector. The counter is reset when a reference mark is detected. An absolute shaft encoder typically utilizes a plurality of tracks. An N-bit binary encoder typically utilizes N such tracks, one per bit.

While incremental encoders are less expensive than absolute encoders, incremental encoders are subject to errors that are often unacceptable. For example, if the circuitry fails to count a transition from a light to dark stripe, the counter, and hence, the position measurement will be in error until the counter is reset the next time the reference point is detected. Absolute encoders, in contrast, can be in error for at most one stripe of the track having the finest resolution. Hence, absolute encoders are preferred in many applications in spite of the additional cost associated with such encoders.

As the size of the mechanical systems that utilize encoders decreases, the size of the encoders must also decrease. One factor that limits the minimum size of an absolute encoder is cross-talk between the detectors used on the various tracks. Each track in the encoder is illuminated with a light source. The light from the illuminated track is imaged onto a corresponding photodetector that determines whether the stripe currently being viewed is light or dark. The light that strikes the detector consists of light that is reflected from the code stripes of the track corresponding to that detector as well as light from an adjacent track that is scattered into the detector due to imperfections in the optical system and code stripes. This scattered light forms a background that reduces the signal-to-noise ratio of the detector, and hence, can lead to errors in the measured position. As the code stripes are reduced in size in an effort to reduce the size of the encoder, the light available from a track decreases, since the size of the stripes must be reduced. In addition, the distance between the tracks decreases, which, in turn, reduces the buffer space between the tracks that protects each detector from scattered light from a neighboring track. Both of these factors lead to reduced signal-to-noise ratios.

The cross-talk problem is particularly acute in reflective encoders. In a reflective encoder, each track consists of a series of reflective and absorptive stripes. Light is reflected from the reflective stripes into the detector associated with the track. While the absorptive stripes can be made nearly ideal by utilizing a hole in the code scale for the absorptive stripes, the reflective stripes are less than ideal. Ideally, the reflective stripes are perfect mirrors. However, in practice, the mirrors have imperfections. In addition, debris accumulates on the surface over time. These factors result in a surface that scatters some portion of the light incident on the surface. Some of the scattered light falls on the detectors corresponding to the adjacent tracks.

SUMMARY OF THE INVENTION

The present invention includes an encoder having a code scale, an illumination system, and a plurality of photodetectors. The code scale has a plurality of tracks that are illuminated by the illumination system. Each photodetector receives light from a corresponding one of the tracks and generates a signal indicative of a quantity of light received from that track. Each photodetector is limited to detecting light in a band of wavelengths corresponding to that track. Each track generates light in a band of wavelengths corresponding to that track, and the band of wavelengths corresponding to one of the tracks is different from the band of wavelengths corresponding to the tracks that are next to that track. The tracks can include alternating reflective and absorptive stripes, alternating transmissive and reflective stripes, or alternating luminescent and absorptive stripes.

BRIEF DESCRIPTION OF THE DRAWINGS

FIG. 1 illustrates a transmissive encoder.

FIG. 2 illustrates one type of reflective encoder.

FIG. 3A is a top view of shaft encoder according to one embodiment of the present invention.

FIG. 4 is a cross-sectional view of shaft encoder 30 through line 4-4 shown in FIG. 3.

FIG. 7 is a cross-sectional view of a multi-channel transmissive encoder 100 according to one embodiment of the present invention.

DETAILED DESCRIPTION OF THE PREFERRED EMBODIMENTS OF THE INVENTION

Figure 3B:
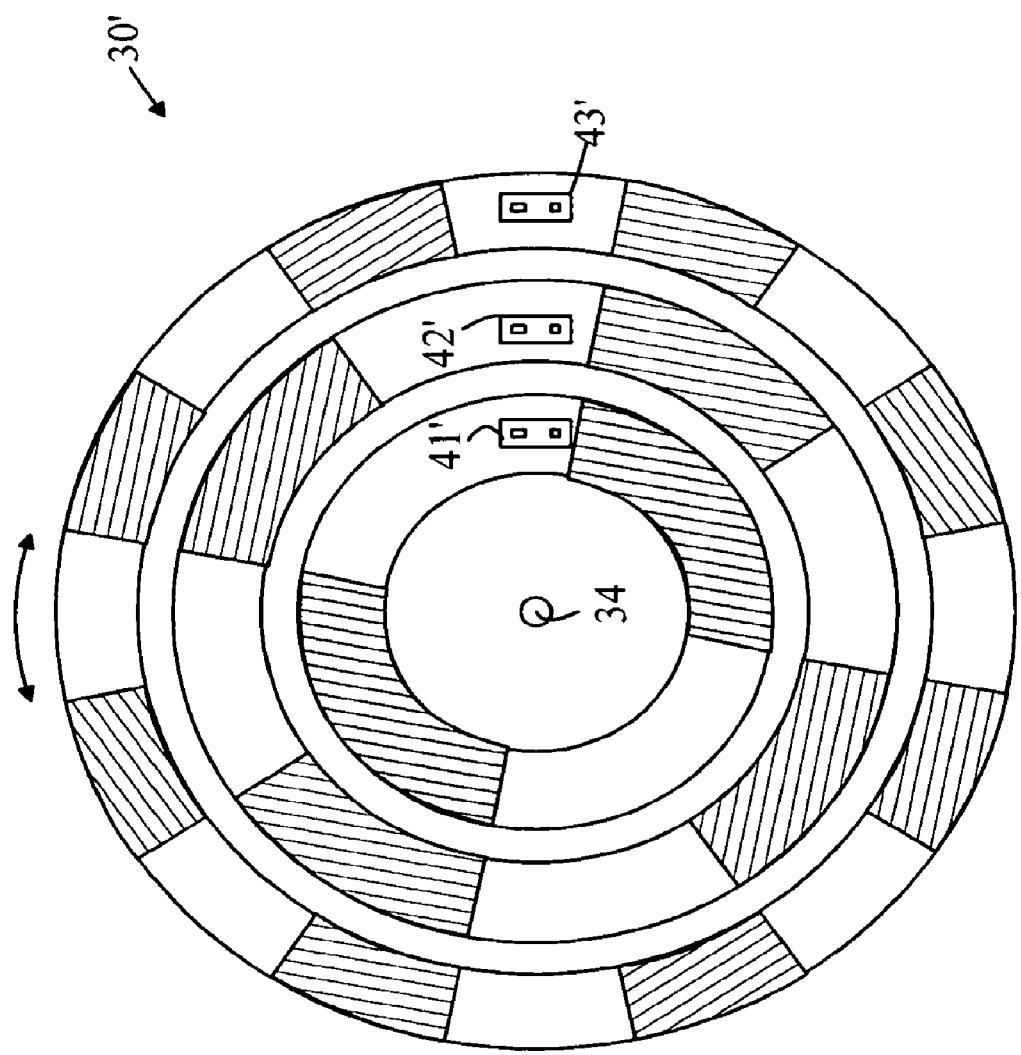
FIG. 3B is a top view of a shaft encoder according to another embodiment of the present invention.

Refer now to FIGS. 1-3, which illustrate some typical encoder designs. The encoder can be divided into an emitter/detector module 15 and a code wheel or code strip. To simplify the terminology used herein, the term "code scale" is defined to include both linear code strips and circular code wheels. Module 15 includes an emitter 11 that illuminates a portion of the code scale 12. A detector 13 views the illuminated code scale. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code scale 12 includes opaque stripes 16 and transparent stripes 17. When code scale 12 moves between emitter 11 and detector 13, the light beam is interrupted by the opaque stripes on the code scale. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code scale and the focal point of lens 25. The distance between the photodetector and the lens determines the size of the code scale image on the photodetector.

In general, the collimator is constructed from two separate sub-modules that are provided to the manufacturer of the encoder. The first sub-module includes the light source consisting of emitter 11 and lens 24. The second sub-module consists of photodetector 13 and lens 25. The code scale consists of either absorptive stripes or holes. Stray light directed toward a neighboring track's detector could be generated by light reflecting off of the side of the holes.

FIG. 2 illustrates one type of reflective encoder. In reflective encoders, the code scale includes reflective stripes 18 and absorptive stripes 19. The light from the emitter is reflected or absorbed by the stripes on the code scale. The emitter includes an optical system such as a lens 21 that images the emitter light source into the detector when the light strikes a reflective stripe on the code scale. The output from the photodetector is again converted to a logic signal. In embodiments in which the photodetector includes a plurality of photodiodes that provide a signal that depends on matching an image of the strips to the photodiodes, a second lens 27 can be included to adjust the size of the code scale image to the size of the photodetectors in a manner analogous to that described above. This arrangement assumes that the reflective stripes are perfect mirrors. As noted above, the mirrors that can be constructed at a reasonable cost are less than perfect, and hence, stray light that can reach neighboring detectors is generated.

Refer now to FIGS. 3A and 4, which illustrate a reflective shaft encoder according to one embodiment of the present invention. FIG. 3 is a top view of shaft encoder 30, and FIG. 4 is a cross-sectional view of shaft encoder 30 through line 4-4 shown in FIG. 3A. Shaft encoder 30 includes a code scale having a number of concentric tracks. To simplify the drawing only the three outer tracks 54-56 are shown in the drawing. Each track has alternating reflective and absorptive stripes. Exemplary reflective and absorptive stripes are shown at 32 and 33, respectively. Code scale 31 rotates about a shaft 34.

Shaft encoder 30 includes one emitter detector module for each track. The emitter detector modules corresponding to tracks 54-56 are shown at 41-43, respectively. Each emitter detector module includes a light source and a photodetector. To simplify the drawings, any lenses associated with the light source or photodetector have been omitted from the drawing; however, it is to be understood that light sources and photodetectors may include one or more lenses. The light sources corresponding to emitter detector modules 41-43 are shown at 44, 47, and 51, respectively. The photodetectors corresponding to emitter detector modules 41-43 are shown at 45, 48, and 52, respectively.

The light sources utilized in shaft encoder 30 emit light in different bands. The bands are chosen such that adjacent emitter detector modules utilize different wavelengths. Hence, light source 47 emits light at a different wavelength than light sources 44 and 51. The light source corresponding to each emitter detector module can have a unique wavelength or band of wavelengths; however, as long as the light sources adjacent to any given light source emit light at a different wavelength, a significant improvement in the cross-talk problem discussed above can be achieved.

In shaft encoder 30, each photodetector includes a bandpass filter that limits that photodetector's response to light emitted by the light source in that photodetectors emitter detector module while blocking light of the wavelengths generated by the light sources in the adjacent emitter detector modules. The bandpass filters corresponding to emitter detector modules 41-43 are shown at 46, 49, and 53, respectively. Hence, any stray light from emitter detector module 42 that reaches emitter detector module 41 or emitter detector module 43 will be eliminated by bandpass filters 46 and 53.

In the embodiment shown in FIG. 3A, the emitter detector modules are aligned radially such that each emitter and detector lies on a radius of the code scale. However, other arrangements can be utilized. Refer now to FIG. 3B which is a top view of a shaft encoder utilizing a different emitter detector module orientation. The emitter detector modules in shaft encoder 30' are oriented such that the line connecting the emitter and detector is tangential to a circle centered on shaft 34.

The above-described embodiment of the present invention is directed to a multi-track encoder in which the reflective areas of the code scale act as mirrors that, together with the various lenses in the light source and photodetector, image the light source onto the photodetector. However, the present invention can also be used to reduce cross-talk in imaging detectors in which the code scale is illuminated with a diffuse light source and the lenses in the photodetectors image a portion of the code scale onto one or more photodiodes in the photodetector.

Figure 6:
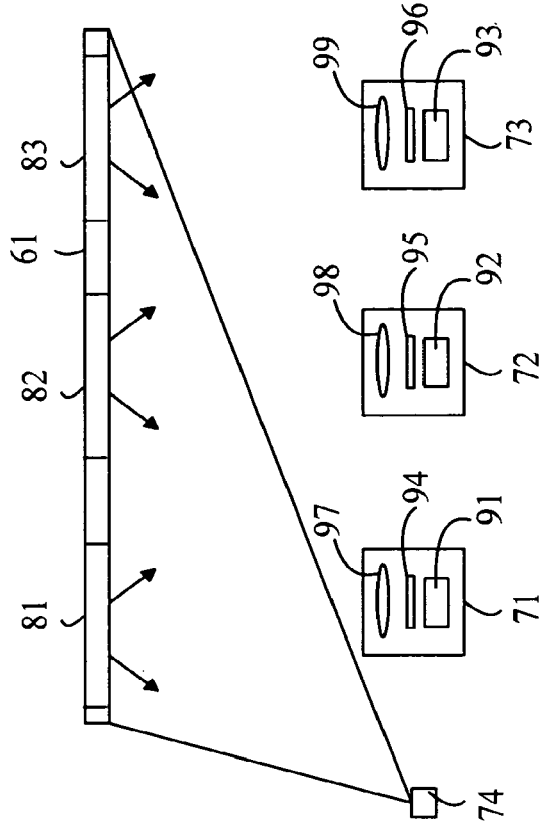
FIG. 6 is a cross-sectional view of shaft encoder 60 through line 6-6 shown in FIG. 5.
Figure 5:
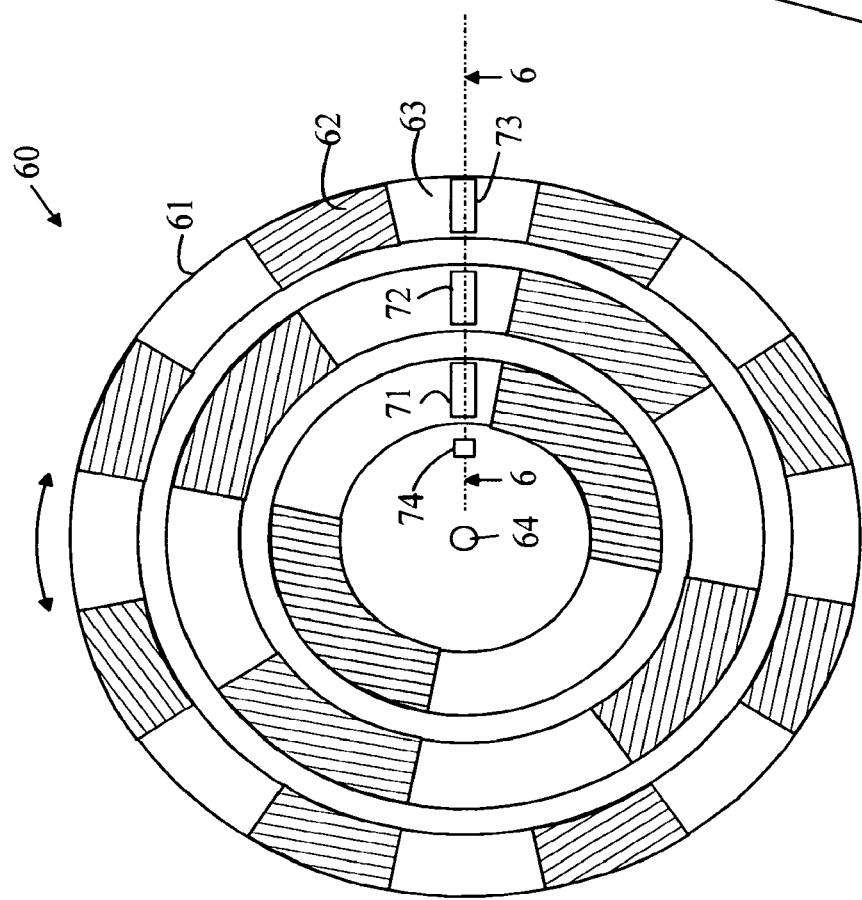
FIG. 5 is a top view of shaft encoder 60.

Refer now to FIGS. 5 and 6, which illustrate an imaging reflective encoder according to another embodiment of the present invention. Shaft encoder 60 measures the rotation of a shaft 64. FIG. 5 is a top view of shaft encoder 60, and FIG. 6 is a cross-sectional view of shaft encoder 60 through line 6-6 shown in FIG. 5. Shaft encoder 60 also includes a code scale 61 having a number of concentric tracks. To simplify the drawing only the three outer tracks 81-83 are shown in the drawing. Each track has alternating bright and absorptive stripes. Exemplary bright and absorptive stripes are shown at 62 and 63, respectively. In contrast to the mirror-like stripes discussed above, the bright stripes form a diffuse light source when illuminated.

The underside of the code scale is illuminated by a light source 74. Light source 74 can be a diffuse light source. Alternatively, light source 74 can be constructed from a point source and a lens that produces a light source with sufficient spread in output angles to illuminate the underside of the code scale in the area viewed by the photodetectors associated with the various tracks.

Each of the tracks has a corresponding detector. The detectors associated with tracks 81-83 are shown at 71-73, respectively. In the embodiment shown in FIGS. 5 and 6, each detector includes a photodetector, a bandpass filter, and a lens. The photodetectors corresponding to detectors 71-73 are shown at 91-93. The bandpass filters corresponding to detectors 71-73 are shown at 94-96, respectively, and the imaging lenses corresponding to detectors 71-73 are shown at 97-99, respectively.

Each imaging lens images a portion of the code scale corresponding to one of the tracks onto the photodetector corresponding to that track. The photodetector typically includes one or more photodiodes. The number of photodiodes and the arrangement of those photodiodes depends on the specific detection algorithm implemented in the detector. Since the present invention does not rely on any specific detection algorithm, the details of the specific arrangement of photodiodes will not be given here.

Each track has an associated "color". That is, the light leaving the bright stripes on the track is restricted to a band of wavelengths. The bandpass filter in the detector associated with that track passes that band of wavelengths while blocking light in the bands generated by the bright stripes on the adjacent tracks. Hence, cross talk is reduced in a manner analogous to that discussed above with reference to shaft encoder 30. The specific color emitted by the bright stripes on each track can be controlled by providing a white code scale covered with a bandpass filter. Note that the bandpass filter can be a layer that is deposited over the track on the code scale. In this case, light source 74 must emit light in all of the wavelength bands used by the tracks. That is, light source 74 must be a broadband source.

While the embodiment shown in FIGS. 5 and 6 utilizes a particular location for light source 74, other placements could be used. Light source 74 can be placed at any location that provides sufficient illumination of the code scale. Furthermore, multiple light sources at different locations could also be utilized.

Alternatively, each bright stripe on a given track can be coated with a fluorescent material that emits light in the wavelength band associated with that track. In this case, light source 74 can be a monochromatic source that emits light at a wavelength that excites all of the phosphors on the code scale. For example, light source 74 could use a blue or UV emitting LED.

Encoder 60 utilizes detectors in which each detector has a separate imaging lens. This arrangement is adapted to a mass produced detection module in which the photodetector and the imaging lens are prepackaged. The assembler of the part using the encoder then positions the individual detector modules under the corresponding tracks and applies the appropriate bandpass filters. However, embodiments in which the individual lenses are replaced with a single imaging lens that images the relevant region of the code scale onto all of the detectors can also be constructed without departing from the teachings of the present invention.

The above-described embodiments of the present invention have been directed to reflective encoders. However, the same principles can be applied to transmissive encoders. Refer now to FIG. 7, which is a cross-sectional view of a multi-channel transmissive encoder 100 according to one embodiment of the present invention. To simplify the drawing, only three channels 101-103 are shown. Code scale 104 includes three tracks corresponding to channels 101-103. Each track includes alternating transmissive and opaque stripes.

Each track is illuminated by a light source on one side of the code scale. The light sources corresponding to tracks 101-103 are shown at 111-113, respectively. Each light source generates a collimated beam of light that is modulated by the stripes on the code scale. Each light source typically utilizes an LED and a collimating lens. For example, light source 111 utilizes LED 121 and lens 131. In this embodiment, the light sources generate light beams having different colors such that adjacent tracks are illuminated with light from different regions of the spectrum.

The light passing through code scale 104 from each light source is measured by a corresponding detector. The detectors corresponding to tracks 101-103 are shown at 141-143, respectively. In this embodiment, each detector includes a lens for imaging the collimated light onto a photodetector and a bandpass filter that limits the light reaching the photodetector to light within a predetermined band corresponding to that detector. The photodetector, bandpass filter, and lens corresponding to detector 141 are shown at 151, 161, and 171, respectively. However, embodiments in which the imaging functions are provided solely in the light source could also be constructed. In such embodiments, the detectors do not require lenses.

It should be noted that embodiments in which the individual light sources are replaced by a single collimated broadband source could also be constructed. In this case, transmissive stripes can include a bandpass filter to pick out the desired portion of the spectrum. Alternatively, an additional band pass filter can be placed between the light source and the corresponding track so as to select the desired portion of the spectrum.

The above-described embodiments of the present invention have been directed to circular encoders of the type used to encode the motion of a shaft. However, linear encoders utilizing the same principles can also be constructed.

It should also be noted that the present invention is not limited to absolute encoders. The present invention can be utilized to construct any multi-track encoder.

Various modifications to the present invention will become apparent to those skilled in the art from the foregoing description and accompanying drawings. Accordingly, the present invention is to be limited solely by the scope of the following claims.

What is claimed is:

1. An encoder comprising
a code scale having a plurality of tracks thereon;
a plurality of bandpass filters applied to the plurality of tracks of the code scale, wherein each of the plurality of bandpass filters corresponds to a specific track of the code scale to filter out light outside of a corresponding band of wavelengths;
an illumination system that illuminates said tracks; and
a plurality of photodetectors, each photodetector receiving light from a corresponding one of said tracks and generating a signal indicative of a quantity of light received from that track, each photodetector being limited to detecting light in the band of wavelengths corresponding to that track,
wherein each track generates light in the band of wavelengths corresponding to that track, and wherein said band of wavelengths corresponding to one of said tracks is different from said band of wavelengths corresponding to said tracks that are next to that track;
wherein each track comprises a plurality of alternating reflective and absorptive stripes and wherein said photodetectors detect light from said illumination system that is reflected from said reflective stripes; and
wherein one of said reflective stripes comprises the corresponding bandpass filter for limiting light leaving that reflective stripe to light in said band of wavelengths corresponding to that track.

2. The encoder of claim 1 wherein said illumination system comprises a plurality of light sources, each light source generating light in a band of wavelengths corresponding to a corresponding one of said photodetectors.

3. The encoder of claim 1 wherein said illumination system comprises a light source that generates light in all of said bands of wavelengths and wherein each photodetector comprises another bandpass filter for blocking light outside of said band of wavelengths corresponding to that photodetector, and an optical system for imaging a portion of said track corresponding to that photodetector onto a photodiode included in that photodetector.

4. The encoder of claim 1 wherein one of said photodetectors comprises a photodiode and the bandpass filter for limiting light reaching said photodiode to light in said band of wavelengths corresponding to that photodetector.

5. An encoder comprising
a code scale having a plurality of tracks thereon;
a plurality of bandpass filters applied to the plurality of tracks of the code scale, wherein each of the plurality of bandpass filters corresponds to a specific track of the code scale to filter out light outside of a corresponding band of wavelengths;
an illumination system that illuminates said tracks; and
a plurality of photodetectors, each photodetector receiving light from a corresponding one of said tracks and generating a signal indicative of a quantity of light received from that track, each photodetector being limited to detecting light in the band of wavelengths corresponding to that track,
wherein each track generates light in the band of wavelengths corresponding to that track, and wherein said band of wavelengths corresponding to one of said tracks is different from said band of wavelengths corresponding to said tracks that are next to that track;
wherein each track comprises a plurality of alternating transmissive and reflective stripes, and wherein said photodetectors detect light from said illumination system that passes through said transmissive stripes; and
wherein one of said transmissive stripes comprises the corresponding bandpass filter for limiting light leaving that transmissive stripe to light in said band of wavelengths corresponding to that track.

6. The encoder of claim 5 wherein said illumination system comprises a plurality of light sources, each light source generating light in a band of wavelengths corresponding to a corresponding one of said photodetectors.

7. The encoder of claim 5 wherein said illumination system comprises a light source that generates light in all of said bands of wavelengths and wherein each photodetector comprises another bandpass filter for blocking light outside of said band of wavelengths corresponding to that photodetector, and an optical system for imaging a portion of said track corresponding to that photodetector onto a photodiode included in that photodetector.

8. The encoder of claim 5 wherein one of said photodetectors comprises a photodiode and the bandpass filter for limiting light reaching said photodiode to light in said band of wavelengths corresponding to that photodetector.

* * * * *